US012512311B2

(12) United States Patent
Nishiguchi

(10) Patent No.: US 12,512,311 B2
(45) Date of Patent: Dec. 30, 2025

(54) METHOD FOR DRIVING LINEAR ION TRAP AND MASS SPECTROMETER

(71) Applicant: SHIMADZU CORPORATION, Kyoto (JP)

(72) Inventor: Masaru Nishiguchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 368 days.

(21) Appl. No.: 18/348,753

(22) Filed: Jul. 7, 2023

(65) Prior Publication Data

US 2024/0087874 A1 Mar. 14, 2024

(30) Foreign Application Priority Data

Sep. 8, 2022 (JP) ................................ 2022-142976

(51) Int. Cl.
*H01J 49/42* (2006.01)

(52) U.S. Cl.
CPC ........ *H01J 49/4225* (2013.01); *H01J 49/423* (2013.01); *H01J 49/4265* (2013.01); *H01J 49/429* (2013.01)

(58) Field of Classification Search
CPC ...... H01J 49/42; H01J 49/4225; H01J 49/423; H01J 49/4255; H01J 49/4265; H01J 49/022
See application file for complete search history.

(56) References Cited

U.S. PATENT DOCUMENTS

| | | | | |
|---|---|---|---|---|
| 7,456,388 B2 | | 11/2008 | Loboda et al. | |
| 9,312,114 B2 | * | 4/2016 | Hock | H01J 49/063 |
| 2005/0127290 A1 | | 6/2005 | Hashimoto et al. | |
| 2011/0057097 A1 | * | 3/2011 | Bateman | H01J 49/424 250/296 |
| 2019/0080896 A1 | | 3/2019 | Zhang et al. | |
| 2019/0157057 A1 | * | 5/2019 | Stewart | H01J 49/0468 |
| 2020/0043736 A1 | * | 2/2020 | Martinsen | B23K 26/0624 |

FOREIGN PATENT DOCUMENTS

| | | | | |
|---|---|---|---|---|
| JP | 4223937 B2 | | 2/2009 | |
| JP | 2018-073703 A | | 5/2018 | |
| JP | 2020-35726 A | | 3/2020 | |
| WO | WO-2015023480 A1 | * | 2/2015 | H01J 49/0422 |

* cited by examiner

*Primary Examiner* — David E Smith
(74) *Attorney, Agent, or Firm* — Sughrue Mion, PLLC

(57) ABSTRACT

A method for driving a linear ion trap having rod electrodes arranged so as to surround a central axis includes: an ion-introducing step for introducing ions into an ion-capturing space surrounded by the rod electrodes, and for capturing the ions by a multipole RF electric field created within the ion-capturing space; and an ion-ejecting step for creating both a DC electric field for ion extraction extending from an external area outside the ion-capturing space into the ion-capturing space through a space between two predetermined rod electrodes neighboring each other around the central axis among the plurality of rod electrodes and the multipole RF electric field, and for sequentially ejecting ions according to their m/z from the ion-capturing space toward the external area through the space between the two predetermined rod electrodes by changing at least one of the multipole RF electric field and the DC electric field.

11 Claims, 9 Drawing Sheets

METHOD FOR DRIVING LINEAR ION TRAP AND MASS SPECTROMETER

TECHNICAL FIELD

The present invention relates to a method for driving a linear ion trap, and a mass spectrometer using a linear ion trap.

BACKGROUND ART

A mass spectrometer which uses an ion trap configured to spatially confine ions by the effect of an electric field has been conventionally known. This type of ion trap can be roughly divided into a liner ion trap and a three-dimensional quadrupole ion trap (which is also called a "Paul trap"). The advantages of the linear ion trap over the three-dimensional quadrupole ion trap include the ease of production due to the comparatively simple shape of the electrodes as well as the large capacity of the ion-capturing space which can hold a larger amount of ions.

Ion traps are not only capable of holding ions; they can also have the function of a mass separator (or mass selector) for ejecting the held ions to the outside of the trap while separating those ions according to their mass-to-charge ratios (m/z). For the mass separation within an ion trap, resonance excitation ejection is normally employed (see Patent Literature 1 or other related documents). In the resonance excitation ejection in a linear ion trap, while an RF voltage for confining ions within the ion-capturing space is applied to each of the rod electrodes, an ion-excitation AC voltage for exciting ions having a specific m/z is additionally applied to specific rod electrodes. This causes ions having that specific m/z to be selectively oscillated to a large extent and ultimately released to the outside through an opening formed in one of the rod electrodes among the various kinds of ions captured within the ion-capturing space due to the effect of the RF electric field.

CITATION LIST

Patent Literature

Patent Literature 1: JP 2018-73703 A
Patent Literature 2: JP 2020-35726 A

SUMMARY OF INVENTION

Technical Problem

The resonance excitation ejection can realize mass separation of ions with a comparatively high level of mass-resolving power. However, as described earlier, the resonance excitation ejection requires the ion-excitation AC voltage to be applied to the rod electrodes in addition to the RF voltages. Therefore, the power-supply device for applying voltages to the rod electrodes has a complex configuration, as described in Patent Literature 2, for example. This causes the device to be larger in size and heavier in weight, as well as increases the cost of the power source.

The present invention has been developed to solve the previously described problem. One of its objectives is to provide a mass spectrometer including a linear ion trap which has a simpler configuration of the power-supply device and yet can perform a mass scan, as well as a method for driving this type of linear ion trap.

Solution to Problem

One mode of the method for driving a linear ion trap according to the present invention developed for solving the previously described problem is a method for driving a linear ion trap in which a plurality of rod electrodes are arranged so as to surround a central axis, the method including:

- an ion-introducing step for introducing ions into an ion-capturing space surrounded by the plurality of rod electrodes, and for capturing the ions by a multipole RF electric field created within the ion-capturing space; and
- an ion-ejecting step for creating both a DC electric field for ion extraction which extends from an external area outside the ion-capturing space into the ion-capturing space through a space between two predetermined rod electrodes neighboring each other around the central axis among the plurality of rod electrodes and the multipole RF electric field, and for sequentially ejecting ions according to mass-to-charge ratios of the ions from the ion-capturing space toward the external area through the space between the two predetermined rod electrodes by changing at least one of the multipole RF electric field and the DC electric field (i.e. either the multipole RF electric field or the DC electric field, or the both).

One mode of the mass spectrometer according to the present invention developed for solving the previously described problem includes:

- a linear ion trap unit including a plurality of rod electrodes arranged so as to surround a central axis, and an extraction electrode located in an external area outside a space between two predetermined rod electrodes neighboring each other around the central axis among the plurality of rod electrodes;
- an RF voltage generator configured to apply an RF voltage to each of the plurality of rod electrodes so as to create a multipole RF electric field within an ion-capturing space surrounded by the plurality of rod electrodes;
- an extraction voltage generator configured to apply a DC voltage to the extraction electrode so that a DC electric field for ion extraction extends through the space between the two predetermined electrodes into the ion-capturing space; and
- a controller configured to control the RF voltage generator and the extraction voltage generator, so as to eject ions from the ion-capturing space through the space between the two predetermined rod electrodes according to the mass-to-charge ratios of the ions by changing at least one of the RF voltage and the DC voltage while the ions are confined within the ion-capturing space.

Advantageous Effects of Invention

The previously described modes of the method for driving a linear ion trap and the mass spectrometer according to the present invention do not require applying two different types of alternating voltages, i.e., the RF and AC voltages, to the rod electrodes in a superposed form as in the resonance excitation ejection. Therefore, according to the previously described modes of the method for driving a linear ion trap and the mass spectrometer according to the present invention, it is possible to simplify the configuration of the power-supply device for driving the linear ion trap while realizing a mass scan in which ions are sequentially released from the linear ion trap in order of mass-to-charge ratio. This consequently allows the power-supply device to be smaller in size and lighter in weight, as well as lower in production cost.

DESCRIPTION OF EMBODIMENTS

An embodiment of the mass spectrometer and the method for driving a linear ion trap according to the present invention is hereinafter described with reference to the attached drawings.

[Schematic Configuration of Mass Spectrometer]

Figure 2:
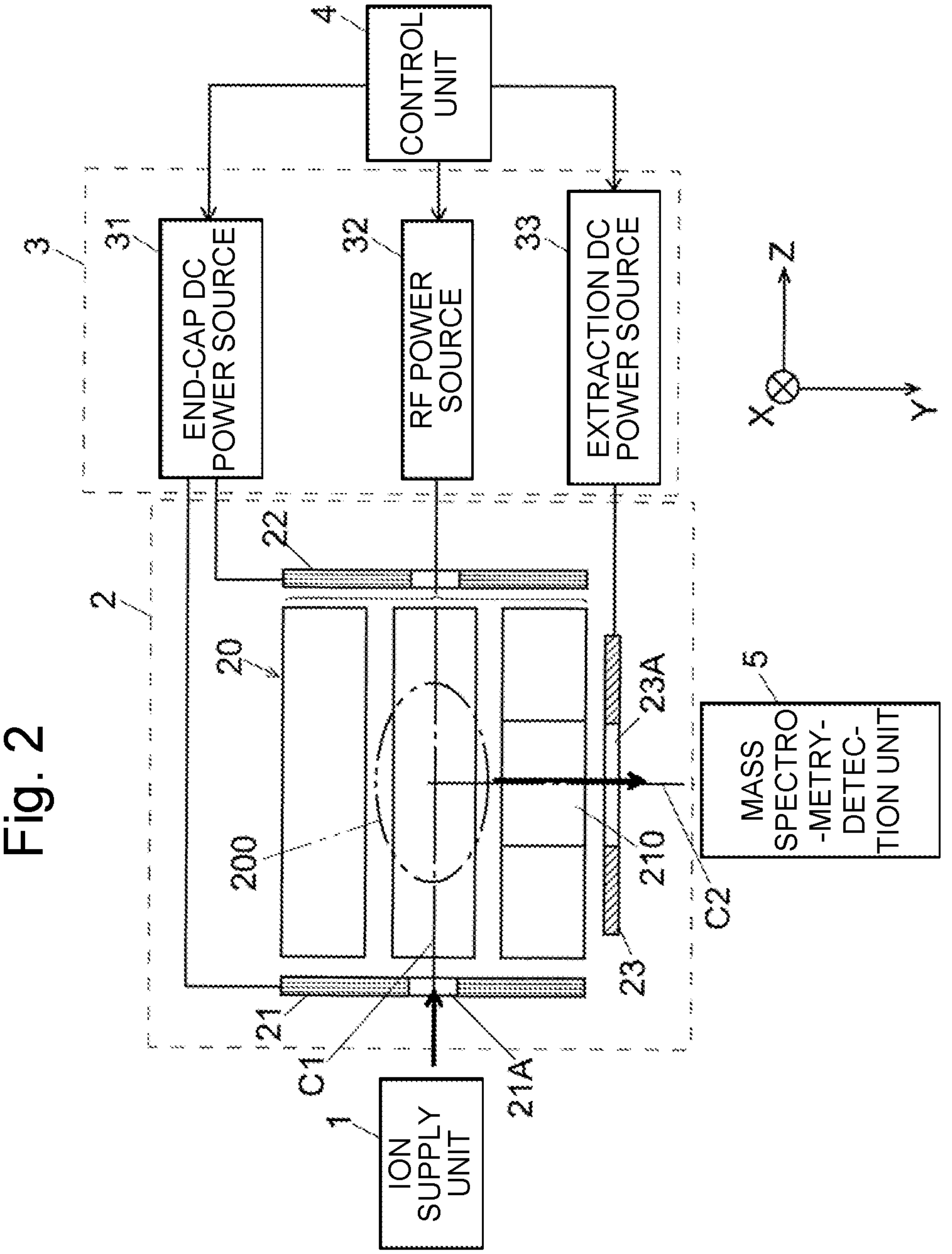
FIG. 2 is a schematic configuration diagram of a mass spectrometer using the linear ion trap shown in FIG. 1.

FIG. 2 is a schematic configuration diagram of one example of the mass spectrometer according to the present invention. For convenience of explanation, three axes of X, Y and Z orthogonal to each other are defined within the space, as shown in the drawing.

This mass spectrometer includes an ion supply unit 1, linear ion trap 2, power supply unit 3, control unit 4 and mass spectrometry-detection unit 5. Though not shown, the ion supply unit 1, linear ion trap 2 and mass spectrometry-detection unit 5 may be arranged within a vacuum chamber or similar space.

The ion supply unit 1, which includes an ion source and other related elements, ionizes various components in a sample and delivers the resulting ions to the linear ion trap 2 in a roughly Z-axis direction. The linear ion trap 2 temporarily holds the ions within its internal space (ion-capturing space 200) as well as ejects the held ions in a roughly Y-axis direction in descending order of m/z. In other words, the linear ion trap 2 is an orthogonal-to-axis ejection type of linear ion trap capable of a mass scan. The power supply unit 3 applies voltages to the electrodes in the linear ion trap 2 under the control of the control unit 4. The mass spectrometry-detection unit 5 has either a configuration including one or more mass separators and a detector, or a configuration including only a detector. In the former case, the mass spectrometry-detection unit 5 receives ions ejected from the linear ion trap 2 and detects those ions after further separating them according to their m/z. In the latter case, the mass spectrometry-detection unit 5 directly detects ions ejected from the linear ion trap 2. Specific configurations of the mass spectrometry-detection unit 5 will be shown in the configuration examples which will be described later.

[Configuration of Linear Ion Trap]

Figure 1:
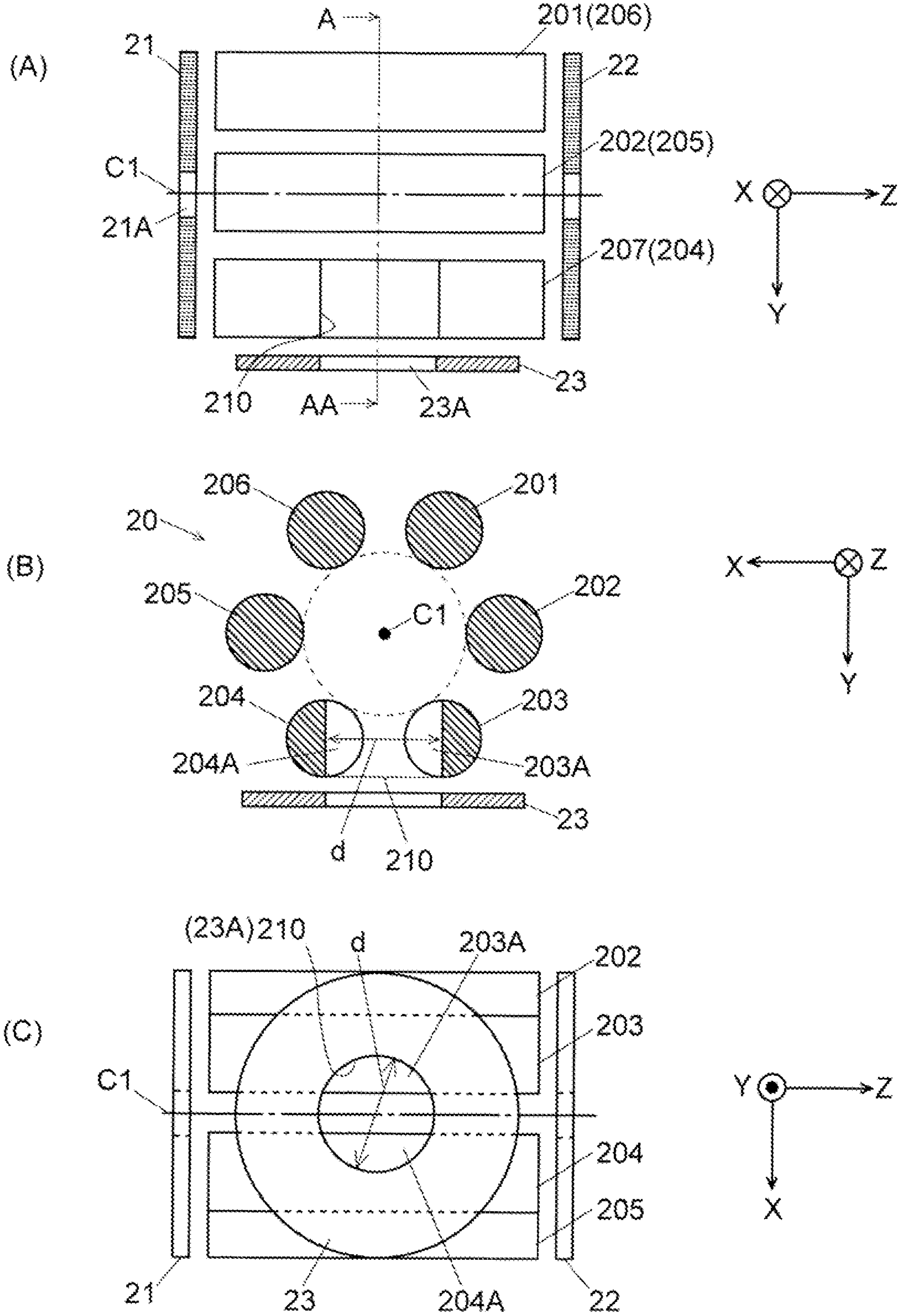
FIG. 1 shows (A) a schematic sectional view from the front side, (B) a sectional view in the direction of arrow A-AA, and (C) a schematic bottom view of one embodiment of a linear ion trap used in the present invention.

FIG. 1 is a diagram for explaining the electrode structure of the linear ion trap 2 shown in FIG. 2. Specifically, (A) is a schematic sectional view from the front side, (B) is a sectional view in the direction of arrow A-AA in (A), and (C) a schematic bottom view.

As shown in FIG. 1, the linear ion trap 2 includes: a rod electrode group 20 formed by six rod electrodes 201, 202, 203, 204, 205 and 206 arranged so as to surround a linear ion incidence optical axis C1 extending in the Z-axis direction; end-cap electrodes 21 and 22 arranged at the two ends of the rod electrode group 20 so as to sandwich this electrode group in between, with each end-cap electrode substantially shaped like a disk having a circular opening at its center; and a disk-shaped extraction electrode 23 having a substantially circular opening 23A. The six rod electrodes 201-206 are externally tangent to a circle centered on the ion incidence optical axis C1 and are arranged at regular intervals of angle (60 degrees) around the ion incidence optical axis C1. Among the six rod electrodes 201-206, the two rod electrodes 203 and 204 has recesses 203A and 204A, respectively, having an arc-like shape in the X-Z plane to form a cylindrical ion extraction opening 220 of diameter d, including a portion of the space between the rod electrodes 203 and 204. The extraction electrode 23 is located outside the ion extraction opening 210. Its opening 23A has a diameter of d.

As shown in FIG. 2, predetermined DC voltages are applied from an end-cap DC power source 31 in the power supply unit 3 to the end-cap electrodes 21 and 22, respectively. Meanwhile, predetermined RF voltages are applied from an RF power source 32 to the six rod electrodes 201-206, respectively. Specifically, the RF voltages applied to the six rod electrodes 201-206 are RF voltages having the same amplitude and frequency, with their polarities inverted between each pair of rod electrodes neighboring each other in the circumferential direction (i.e., with a phase shift of 180 degrees). A predetermined DC voltage is applied from an extraction DC power source 33 to the extraction electrode 23.

[Operation of Linear Ion Trap]

Figure 7A:
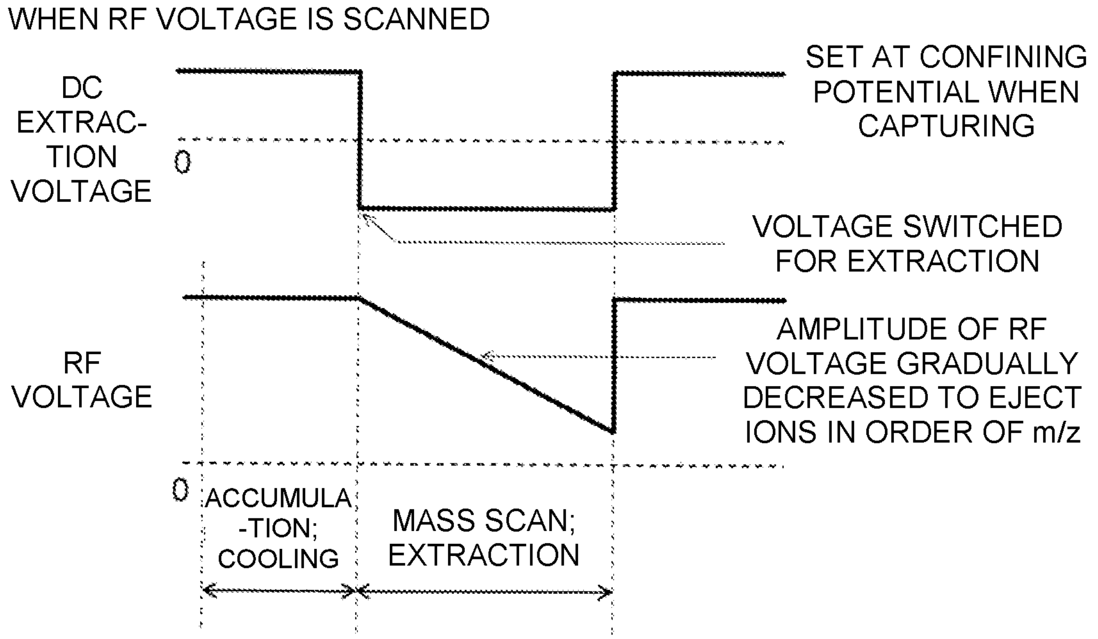
FIGS. 7A and 7B are charts showing examples of the voltage change for a mass scan in the linear ion trap according to the present embodiment.
Figure 7B:
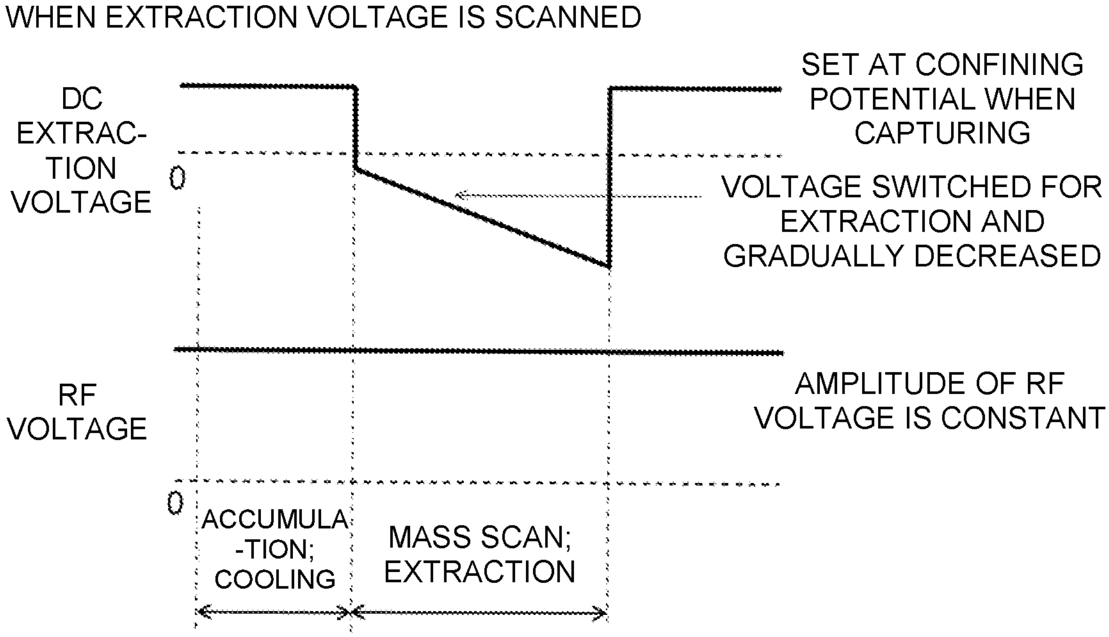

Examples of the basic operation of the linear ion trap 2 are hereinafter described. FIGS. 7A and 7B are timing charts showing examples of the change in the voltage applied for driving the linear ion trap 2. Specifically, FIG. 7A is the case of performing a mass scan by changing the RF voltage, while FIG. 7B is the case of performing a mass scan by changing the DC extraction voltage.

In FIG. 2, the ion supply unit 1 generates various kinds of ions originating from a sample to be analyzed and sends those ions in a roughly Z-axis direction. The end-cap DC power source 31 applies DC voltages to the end-cap electrodes 21 and 22, respectively, so as to create a DC electric field which admits the ions from the ion supply unit 1 for a predetermined period of time and blocks the ions in front of the entrance end-cap electrode 21 after the aforementioned period of time has passed. The RF power source 32 applies predetermined RF voltages to the rod electrodes 201-206, respectively, so as to create, within the ion-capturing space 200, a multipole RF electric field for capturing various kinds of ions introduced through the opening 21A of the entrance end-cap electrode 21.

The multipole RF electric field generates a pseudo-RF potential having the effect of confining ions. The characteristics of the linear ion trap, such as the mass dependency of the ion-confining capability and the converging force for gathering ions into the vicinity of the central axis, significantly vary depending on the number of rod electrodes, i.e., the number of poles. Normally, increasing the number of poles lowers the mass dependency of the confining capability (which means that ions can be confined across a wider range of m/z), while the converging force is also thereby lowered. Accordingly, although the hexapole configuration is used in the present embodiment, the number of poles different from six may also be selected according to the desired characteristics. In any case, the various kinds of ions originating from the sample are confined within the ion-capturing space 200 due to the effect of the pseudo-RF potential created by the multipole RF electric field.

Though not shown, the linear ion trap 2 can be internally supplied with an inert gas, such as a helium or argon gas, introduced through an inert gas introduction tube. The various kinds of ions captured within the ion-capturing space 200 come in contact with the inert gas and are thereby deprived of kinetic energy. In other words, those ions undergo the cooling within the ion-capturing space 200, which makes the ions more likely to be gathered around the center in the longitudinal direction (Z-axis direction).

Meanwhile, the extraction DC power source 33 applies a predetermined DC voltage to the extraction electrode 23. During the period of time in which ions are to be captured and cooled within the ion-capturing space 200, a high level of DC voltage equivalent to the voltages applied to the end-cap electrodes 21 and 22 is applied to the extraction electrode 23 so as to reinforce the confinement of the ions. The DC voltage in this situation is a positive DC voltage, as shown in FIGS. 7A and 7B, when the ions are positive for example. Due to the confining effect by the pseudo-RF potential combined with the confining effect by the electric field created by the DC voltages respectively applied to the end-cap electrodes 21 and 22 as well as the extraction electrode 23, the ions are satisfactorily confined within the ion-capturing space 200.

After the cooling of the ions has been performed for a predetermined period of time, the DC extraction voltage applied from the extraction DC power source 33 to the extraction electrode 23 is switched to the polarity opposite to the polarity of the ions, as shown in FIG. 7A for example. The electric field created by this DC voltage has the effect of attracting ions and extends through the ion extraction opening 210 into the ion-capturing space 200. Therefore, when ions are held within the ion-capturing space 200 by the multipole RF electric field in the previously described manner, the force due to the DC electric field also acts on those ions. However, in this situation, the ions can remain within the ion-capturing space 200 since the confining effect by the pseudo-RF potential is greater than the force acting on the ions due to the DC electric field.

Simultaneously with or immediately after the switching of the DC extraction voltage in the previously described manner, the RF power source 32 changes the RF voltages applied to the rod electrodes 201-206 so that the amplitude of the RF voltages gradually decreases. The magnitude of the confining effect on an ion by the pseudo-RF potential within the linear ion trap is inversely proportional to the mass of the ion. In other words, an ion having a larger m/z value is less effectively confined by the pseudo-RF potential and can more easily leave the ion-capturing space 200. Therefore, when the RF voltages applied to the rod electrodes 201-206 are changed so that the amplitude of the RF voltages gradually decreases, the binding force acting on the ions gradually decreases in descending order of m/z, starting from ions having larger m/z values. By comparison, the DC extraction electric field created by the extraction electrode 23 uniformly acts on all ions regardless of the mass of each ion. Therefore, the ions are sequentially attracted by the DC extraction electric field, starting from an ion on which the binding force by the pseudo-RF potential has been decreased, i.e., in descending order of the m/z values of the ions. The attracted ions pass through the ion extraction opening 210 between the two rod electrodes 203 and 204, as well as the opening 23A, to be extracted to the outside in a roughly Y-axis direction (along the ion beam axis C2).

When the RF voltages are changed so that their amplitude gradually decreases while the DC extraction voltage is constantly maintained in the previously described manner, the ions held within the ion-capturing space 200 of the liner ion trap 2 are sequentially ejected in descending order of m/z value through the ion extraction opening 210 and the opening 23A. That is to say, a mass scan of the ions extracted from the linear ion trap 2 in descending order of m/z is achieved.

FIG. 7B shows another possibility, in which, unlike the previously described case in which the amplitude of the RF voltage is changed, the amplitude of the RF voltage is constantly maintained, or in other words, the ion-confining effect by the pseudo-RF potential is constantly maintained, while the voltage value of the DC voltage applied to the extraction electrode 23 is changed so as to gradually increase the strength of the DC extraction electric field. This operation also enables the mass scan in which the ions are sequentially extracted in descending order of m/z value, as in the previously described case in which the amplitude of the RF voltage is changed.

It should be noted that changing the DC extraction voltage for a mass scan as in the example of FIG. 7B additionally causes a change in the amount of energy which the ions possess after passing through the extraction electrode 23. This is inconvenient when the amount of kinetic energy of the ions ejected from the linear ion trap should be constantly maintained, as in the case where the linear ion trap is located within a collision cell in a Q-TOF mass spectrometer, as will be described later. In such a case, the system which performs a mass scan by changing the RF voltage rather than the DC extraction voltage can preferably be adopted.

Figure 3:
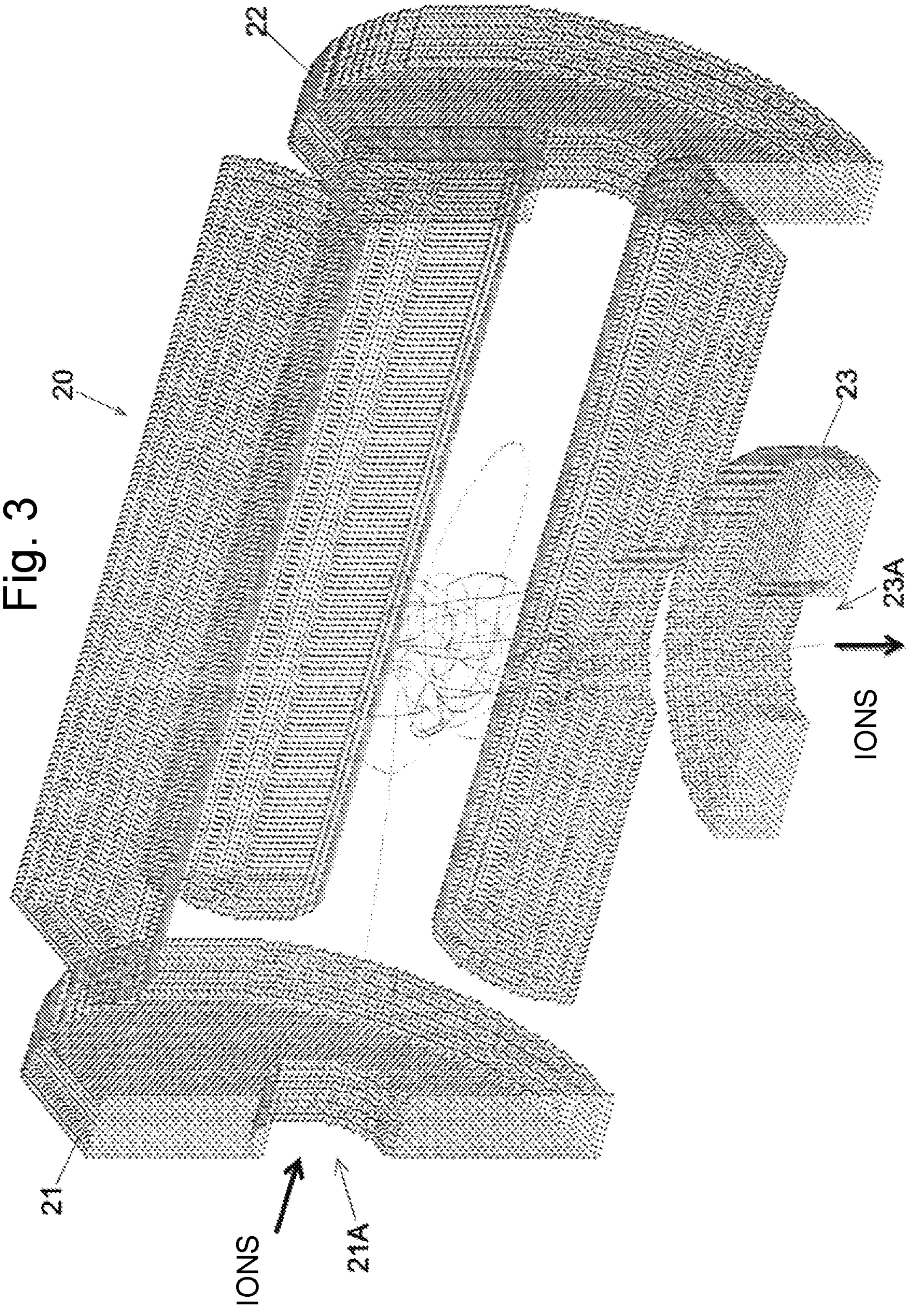
FIG. 3 shows one example of the simulation result of an ion trajectory in the linear ion trap according to the present embodiment.

FIG. 3 shows one example of the result of a simulation of the trajectories of ions from their introduction into the ion-capturing space of the linear ion trap 2 to their extraction to the outside. It should be noted that the drawing shows the trajectory of a single ion so as to make the ion's trajectory easy to visually comprehend.

As can be understood from FIG. 3, the ions enter the ion-capturing space through the opening 21A of the entrance end-cap electrode 21 and are accumulated within the same space while being cooled through the collision with the gas present within the ion-capturing space. In this situation, a DC voltage comparable to the voltage applied to the end-cap electrodes 21 and 22 is applied to the extraction electrode 23. At the timing to extract the ions, the polarity of the DC voltage applied to the extraction electrode 23 is inverted, and the magnitude of the DC extraction voltage is increased so as to gradually increase the strength of the extraction electric field, or the amplitude of the RF voltage is gradually decreased, whereby the ions are sequentially extracted to the outside in descending order of m/z. Since the gas pressure within the ion-capturing space in this simulation is set at a high level of 1 Pa, the ion-cooling effect works sufficiently, and therefore, it is unnecessary to switch the voltage to the entrance end-cap electrode 21 in order to confine the ions. However, it may be preferable to switch the voltage applied to the entrance end-cap electrode 21 in order to confine the ions, as in the case where the gas pressure within the ion-capturing space is set within a lower pressure range.

Figure 4:
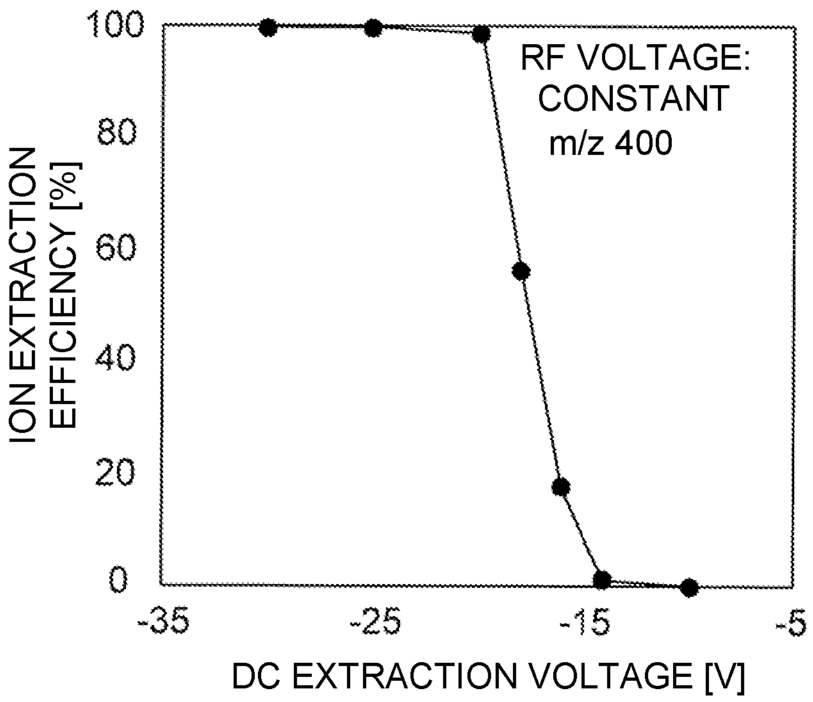
FIG. 4 is a graph showing one example of the calculation result of the relationship between the DC extraction voltage and the ion extraction efficiency in the linear ion trap according to the present embodiment.
Figure 5:
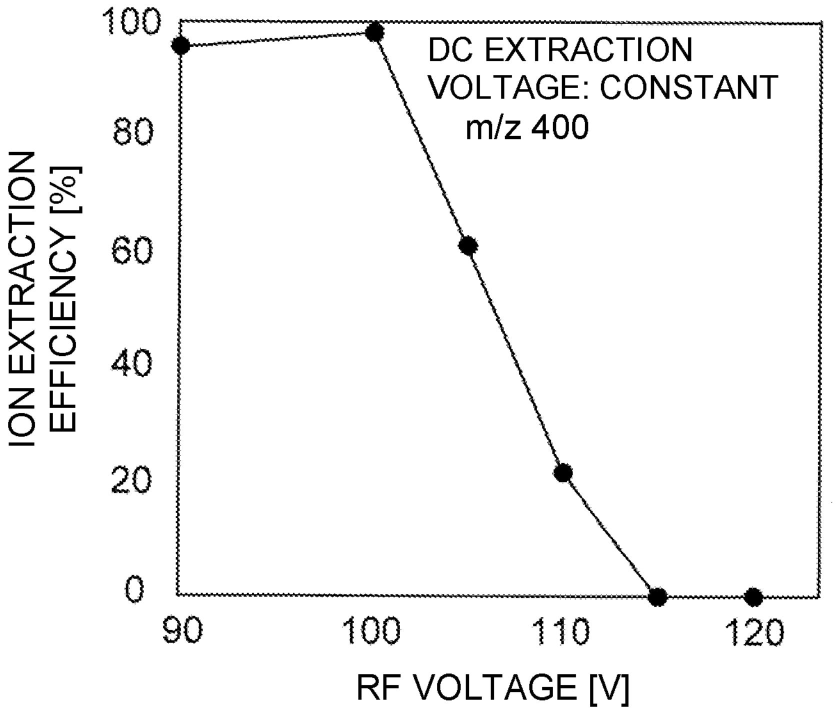
FIG. 5 is a graph showing one example of the calculation result of the relationship between the RF voltage and the ion extraction efficiency in the linear ion trap according to the present embodiment.
Figure 6:
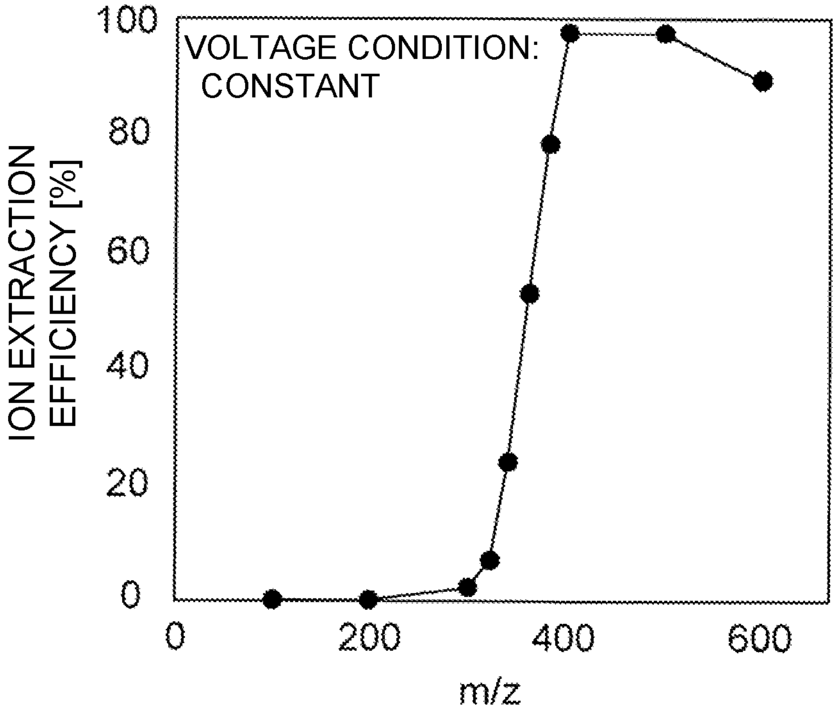
FIG. 6 is a graph showing one example of the calculation result of the relationship between the m/z value of the ion and the ion extraction efficiency in the linear ion trap according to the present embodiment.

FIGS. 4-6 are graphs showing the results of simulation calculations of the ion-extraction efficiency from the linear ion trap 2. FIG. 4 shows the relationship between the DC extraction voltage and the extraction efficiency in the case where the RF voltage was constantly maintained at 100 V. FIG. 5 shows the relationship between the RF voltage and the extraction efficiency in the case where the DC extraction voltage was constantly maintained at −20 V. In both FIGS. 4 and 5, only one kind of ion, m/z 400, was considered as the target ion. FIG. 6 shows the relationship between the m/z value and the extraction efficiency in the case where the RF voltage and the extraction voltages were constantly maintained.

In FIGS. 4-6, an extraction efficiency of 0% means a situation in which ions are present in a stable manner and confined within the ion-capturing space, while an extraction efficiency of 100% means a situation in which ions cannot be present in a stable manner within the ion-capturing space, so that all ions will be extracted. FIG. 4 demonstrates that setting the DC extraction voltage at −10V with the RF voltage constantly maintained does not cause extraction of the ions of m/z 400; the ions of m/z 400 begin to be gradually extracted when the voltage value of the DC extraction voltage being gradually increased (in absolute value) exceeds −15 V, and the ions of m/z 400 are almost entirely extracted when the voltage value of the DC extraction voltage is set to be approximately −20 V or lower. FIG. 5 demonstrates that setting the amplitude of the RF voltage at 120 V with the DC extraction voltage constantly maintained does not cause extraction of the ions of m/z 400; the ions of m/z 400 begin to be gradually extracted when the amplitude of the RF voltage being gradually decreased becomes lower than approximately 115 V, and the ions of m/z 400 are almost entirely extracted when the amplitude of the RF voltage is set to be approximately 100 V or lower.

As noted earlier, the ion-confining capability due to the pseudo-RF potential is inversely proportional to the mass of the ion. FIG. 6 demonstrates that the effect according to this principle can be obtained in which ions of higher masses are more likely to be ejected from the linear ion trap when the voltage condition is unchanged, which means that the trap acts as a high-pass mass filter. The mass selectivity under the voltage condition shown in FIG. 6 is such that the largest portion of the ions of m/z 400 or higher can be ejected while ions of m/z 300 or lower are almost entirely retained within the linear ion trap. This mass selectivity can be improved by optimizing the gas pressure, RF voltage, DC extraction voltage and other related parameters. The decrease in the extraction efficiency for ions of m/z 600 or higher in FIG. 6 is due to the loss of the ions in the accumulation process. This occurs since the ion-confining force by the pseudo-RF potential decreases with increasing m/z. Increasing the number of poles of the multipole field is effective for improving the ion-confining force. Therefore, when the supply of high m/z ions particularly needs to be raised, it is preferable to increase the number of poles of the linear ion trap.

As described thus far, the parameters which significantly influence the performance of the previously described linear ion trap include the gas pressure, number of poles of the multipole field, RF voltage and DC extraction voltage. Through the combination and variation of the values of these parameters, the manipulation of ions can be performed in a flexible, purposeful manner. This is also one of the features of this linear ion trap.

[First Configuration Example of Mass Spectrometer]

A specific configuration example of the previously described mass spectrometer is hereinafter described.

There are various types of mass separators used in mass spectrometers, among which the type of mass separator which is most widely used currently is a quadrupole mass filter. Quadrupole mass filters are also used in tandem mass spectrometers, including not only triple quadrupole mass spectrometers but also quadruple time-of-flight mass spectrometers and quadrupole Fourier transform mass spectrometers.

Quadrupole mass filters are an easy-to-use type of mass separator. However, since this type of mass separator is configured to selectively allow ions having a specific m/z (or falling within a certain m/z range), there is the problem that a considerable amount of ions having other m/z values which are not allowed to pass through are wasted. That is to say, the efficiency of the use of the ions in the quadrupole mass filter is not always high.

Figure 8:
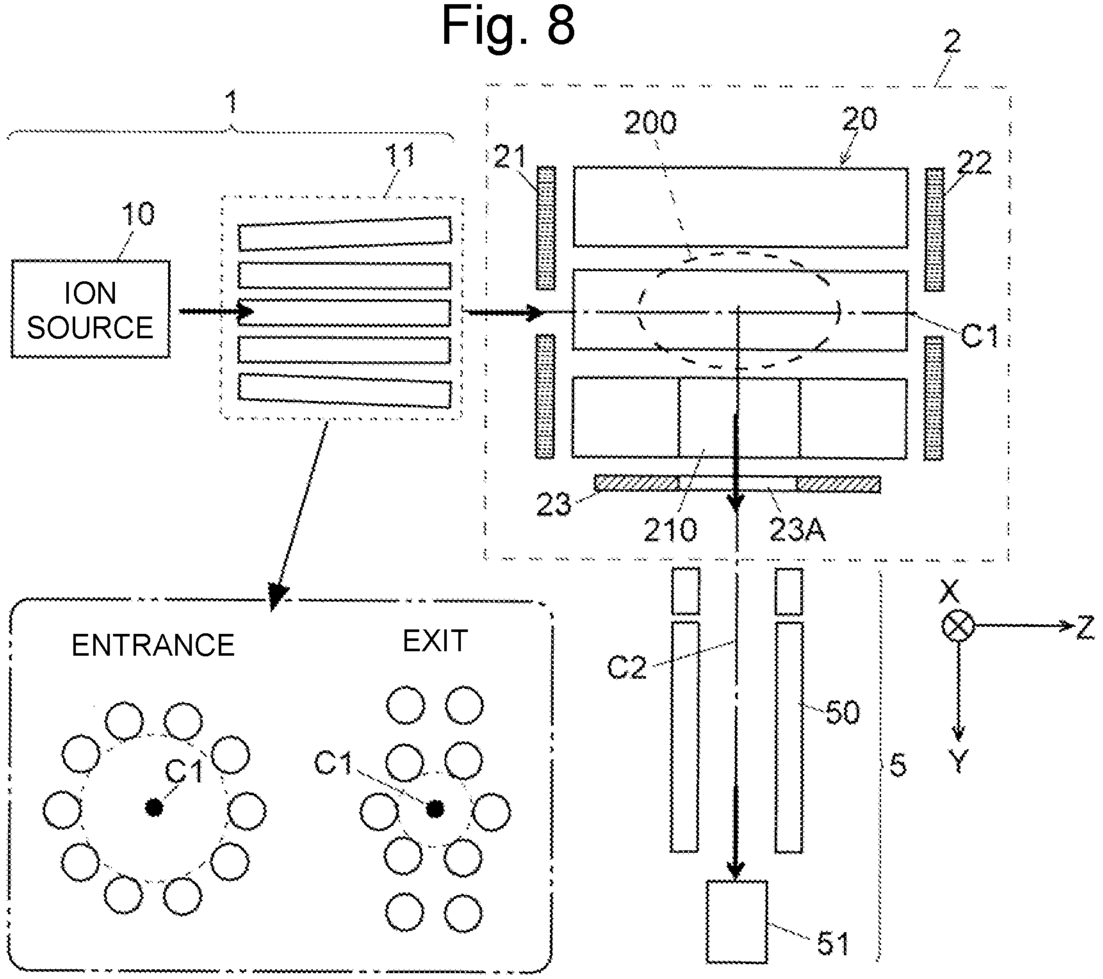
FIG. 8 is a diagram showing a configuration example of a mass spectrometer using the linear ion trap according to the present embodiment.

The previously described linear ion trap can be used to solve this problem. FIG. 8 is a schematic configuration diagram of the mass spectrometer according to the first configuration example.

In this mass spectrometer, the mass spectrometry-detection unit 5 incudes a quadrupole mass filter 50 and an ion detector 51. The linear ion trap 2 configured in the previously described manner is located before the quadrupole mass filter 50. The ion supply unit 1 includes an ion source 10 and a pole-number conversion ion guide 11. Ions released from the pole-number conversion ion guide 11 are introduced into the linear ion trap 2.

The pole-number conversion ion guide 11 is a multipole ion guide described in WO 2020/129199 A, in which at least some of the rod electrodes are arranged in an inclined form with respect to the linear ion beam axis so that the number of poles at the ion entrance end is different from the number of poles at the ion exit end. In the present case, ten rod electrodes are used so as to form a decapole arrangement at the ion entrance end at which the ten rod electrodes are arranged at substantially regular intervals of angle around the ion beam axis C1, as well as a hexapole arrangement at the ion exit end at which only six of the ten rod electrodes are arranged at substantially regular intervals of angle around the ion beam axis C1.

As with the linear ion trap, the ion-confining force of the multipole ion guide also increases with the number of poles. Therefore, the arrangement having a large number of poles at the ion entrance end can efficiently collect a gradually spreading beam of ions coming from the previous stage into the inner space of the ion guide. On the other hand, the ion-converging effect increases with a decrease in the number of poles. Therefore, the arrangement having a smaller number of poles at the ion exit end can effectively converge ions into the vicinity of the ion beam axis C1 and send them to the subsequent stage with a minimum loss. The pole-number conversion ion guide 11 can also create an axial electric field for transporting (or accelerating) ions in their direction of travel by a DC voltage applied to the rod electrodes.

In this configuration, the reason for the pole-number conversion ion guide 11 having the hexapole arrangement at the ion exit end is to make the number of poles at the ion exit end of the pole-number conversion ion guide 11 equal to that of the linear ion trap 2, for the sake of the matching of the mass selectivity of the multipole electric field. However, this configuration is not essential.

With reference to the timing chart shown in FIG. 9, a typical operation of the present mass spectrometer is hereinafter described. Ions generated from sample components in the ion source 10 are introduced into the pole-number conversion ion guide 11. As described earlier, an axial electric field in the direction of travel of the ions and a multipole RF electric field are created within the inner space of the pole-number conversion ion guide 11. These electric fields cause the ions to travel toward the exit while being converged. The entrance end-cap electrode 21 of the linear ion trap 2 is normally supplied with a DC voltage which gives this electrode a potential that forms a barrier against the ions. Therefore, the ions which have reached an exit area of the pole-number conversion ion guide 11 are blocked in front of the entrance end-cap electrode 21 and accumulated within the exit area of the pole-number conversion ion guide 11.

Figure 9:
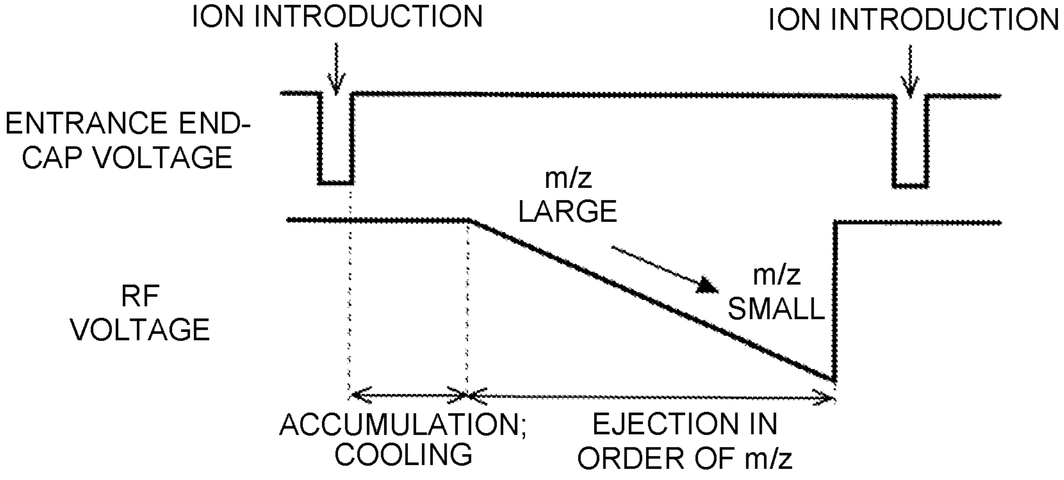
FIG. 9 is a diagram showing one example of the timing chart in the mass spectrometer shown in FIG. 8.

As shown in FIG. 9, the voltage applied to the entrance end-cap electrode 21 is temporarily decreased at a predetermined timing. The potential barrier disappears only at this timing, whereupon the ions accumulated within the exit area of the pole-number conversion ion guide 11 are introduced through the opening 21A into the inner space (ion-capturing space 200) of the linear ion trap 2. Thus, the transfer of the ions from the pole-number conversion ion guide 11 to the linear ion trap 2 is performed in a packet-like form. After the transfer of the accumulated ions has been completed, the voltage applied to the entrance end-cap electrode 21 is once more increased, whereupon ions again begin to be accumulated within the exit area of the pole-number conversion ion guide 11. By accumulating ions within the exit area of the pole-number conversion ion guide 11 in this manner, the loss of the ions continuously supplied from the ion source 10 can be avoided, and the ions can be introduced into the linear ion trap 2 with a high level of efficiency even in the case where there is only a limited period of time during which ions can be introduced into the linear ion trap 2.

After the ions introduced into the ion-capturing space 200 of the linear ion trap 2 have been captured in a satisfactory manner while being cooled through their contact with the gas in the previously described manner, the amplitude of the RF voltages applied to the rod electrode group 20 is gradually decreased, whereby the ions are extracted in descending order of m/z along the ion beam axis C2 through the opening 23A of the extraction electrode 23. During this operation, the scan of the RF voltage applied to the rod electrode group 20 of the linear ion trap 2 is controlled to be synchronous with that of the voltage applied to the quadrupole mass filter 50 (which consists of an RF voltage and a DC voltage superposed on each other) so that an ion having a predetermined m/z ejected from the linear ion trap 2 will be selected by the quadrupole mass filter 50 in the subsequent stage, or in other words, so that the aforementioned m/z becomes equal to the m/z of the ion which is allowed to pass through the quadrupole mass filter 50.

In a conventional quadrupole mass spectrometer using a quadrupole mass filter as a mass separator, when a mass scan is performed with the quadrupole mass filter, the efficiency of the use of the ions is not always high since ions other than those which are allowed to pass through are disposed of. By comparison, in the mass spectrometer according to the first configuration example, ions having m/z values which are likely to pass through the quadrupole mass filter 50 are selected from the ions accumulated within the linear ion trap 2 and ejected from the linear ion trap 2 into the quadrupole mass filter 50. Therefore, ions which would be lost at the quadrupole mass filter in the conventional case can be effectively used. Consequently, the present device can achieve a higher level of sensitivity than the conventional quadrupole mass spectrometer. Furthermore, since the largest portion of the ions originating from sample components generated in the ion source 10 can be subjected to the mass spectrometry, it is unlikely to miss a transiently generated ion having a specific m/z. This is useful for an exhaustive detection of ions originating from sample components.

The first configuration example is a single type of quadrupole mass spectrometer. The linear ion trap 2 can also be located before the first quadrupole mass filter in a triple quadrupole mass spectrometer capable of an MS/MS analysis. In this case, the linear ion trap and the first quadrupole mass filter can be synchronously controlled so that the m/z of the ion ejected from the linear ion trap will be roughly equal to that of the ion allowed to pass through the first quadrupole mass filter when a mass scan is performed with the first quadrupole mass filter as in the case of a precursor ion scan measurement or neutral ion scan measurement, for example.

[Second Configuration Example of Mass Spectrometer]

In a Q-TOF mass spectrometer having a collision cell located between a quadrupole mass filter and an orthogonal acceleration time-of-flight mass separator, various product ions can be generated from one kind of precursor ion within the collision cell. The periods of time required for those ions to reach the orthogonal acceleration section after being almost simultaneously ejected from the collision cell vary depending on the m/z of each ion. Therefore, when ions are accelerated in a pulsed form in the orthogonal acceleration section, there may be the case where only the product ions included within a limited m/z range can be accelerated among the product ions of various m/z values originating from one kind of precursor ion. In that case, the m/z range of the observable product ions is limited, and the correct product-ion spectrum cannot be obtained.

Figure 10:
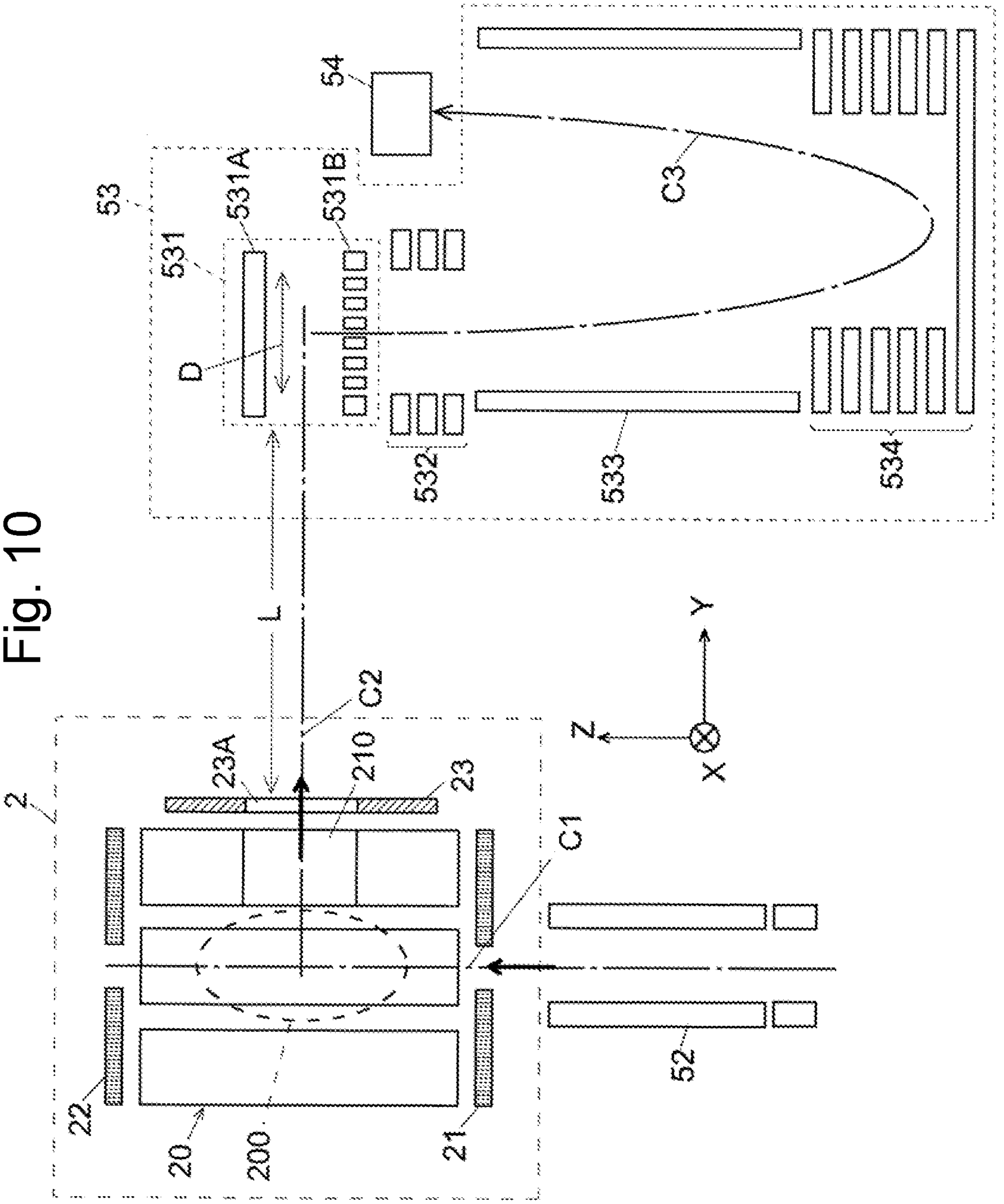
FIG. 10 is a diagram showing another configuration example of a mass spectrometer using the linear ion trap according to the present embodiment.

The mass spectrometer according to the second configuration example uses the previously described linear ion trap to solve this problem. FIG. 10 is a schematic configuration diagram of the mass spectrometer according to the second configuration example.

In the present mass spectrometer, the mass spectrometry-detection unit 5 includes a quadrupole mass filter 52, orthogonal acceleration time-of-flight mass separator 53 and ion detector 54, with the linear ion trap 2 having the previously described configuration arranged within a collision cell (not shown) located between the quadrupole mass filter 52 and the orthogonal acceleration time-of-flight mass separator 53. The component corresponding to the ion supply unit 1 is omitted in FIG. 10. The orthogonal acceleration time-of-flight mass separator 53 includes an orthogonal acceleration section 531, which includes a push-out electrode 531A paired with a pulling electrode 531B, as well as an acceleration electrode 532, flight tube 533 and reflection electrode 534.

The quadrupole mass filter 52 selectively allows an ion having a specific m/z to pass through among the ions supplied from the ion supply unit (not shown). This ion is introduced into the ion-capturing space 200 of the linear ion trap 2 and comes in contact with a collision gas supplied into the ion-capturing space 200, whereby the ion undergoes dissociation and generates various kinds of product ions. The generated product ions are captured within the ion-capturing space 200 by the RF electric field. Subsequently, while the DC extraction voltage is constantly maintained, the RF voltages applied to the rod electrode group 20 are gradually varied, whereby the product ions held within the ion-capturing space 200 are sequentially ejected in descending order of m/z through the ion extraction opening 210 and the opening 23A. The ejected ions travel roughly along the ion beam axis C2 and reach the orthogonal acceleration section 531.

Since the DC extraction voltage is constantly maintained, the ions ejected from the linear ion trap 2 due to the effect of the DC extraction electric field equally receive the same amount of energy regardless of the m/z of each ion. Therefore, an ion having a smaller m/z and ejected at a later point in time travels at a higher speed than an ion having a larger m/z and ejected at an earlier point in time. Accordingly, by appropriately controlling the change of the RF voltage, it is possible to cause all ions sequentially ejected from the linear ion trap 2 with different amounts of temporal delay to almost simultaneously arrive at a specific position within the orthogonal acceleration section 531.

In the orthogonal acceleration time-of-flight mass separator 53, the ions are introduced into the orthogonal acceleration section 531 in the Y-axis direction along the ion beam axis C2. At the timing at which the various kinds of ions having different m/z values almost simultaneously enter the orthogonal acceleration section 531 in the previously described manner, two predetermined DC voltages are applied to the push-out electrode 531A and the pulling electrode 531B, respectively. The ions having various m/z and travelling through the orthogonal acceleration section 531 at that timing are thereby pushed through the slit in the pulling electrode 531B in the negative direction of the Z axis and subsequently accelerated by the acceleration electrode 532, to be ejected into the flight tube 533.

The ions fly in the flight tube 533. After being repelled by the electric field created by the reflection electrode 534, the ions once more fly in the flight tube 533. Ions which have completed their flight along the return path C4 in this manner ultimately reach the ion detector 54 and are thereby detected. Since each of the ions which were almost simultaneously ejected from the orthogonal acceleration section 531 has a specific time of flight according to its m/z, those ions are separated from each other during their flight and sequentially reach the ion detector 54 in ascending order of m/z.

Thus, in the mass spectrometer according to the second configuration example, ions having a wide range of m/z supplied from the linear ion trap 2 can be sent into the flight space without being wasted and can be subjected to the mass spectrometry. Therefore, product ions having a wide range of m/z can be detected with a high level of sensitivity.

In this mass spectrometer, in order to cause all ions ejected from the linear ion trap 2 toward the orthogonal acceleration section 531 to almost simultaneously reach the orthogonal acceleration section 531 in the previously described manner, the extraction of the ions from the liner ion trap 2 can be preferably controlled as follows.

As shown in FIG. 10, let L denote the distance from the extraction electrode 23 to the orthogonal acceleration section 531. Let also D denote the length of the ion passage area in the orthogonal acceleration section 531. Assume that the space from the extraction electrode 23 to the orthogonal acceleration section 531 is equipotential. Then, provided that an ion of electric charge e which has been fully cooled is accelerated by a DC extraction voltage $V_E$, the kinetic energy which the ion possesses when extracted from the linear ion trap 2 is $eV_E$. Suppose that there is no collision of this ion with neutral particles during its travel from the extraction electrode 23 to the orthogonal acceleration section 531. Then, in a conventional technique (in which all ions are almost simultaneously extracted), the time t for an ion having the smallest mass $m_1$ to arrive at the exit of the orthogonal acceleration section 531 is expressed by the following equation (1):

$$t=(D+L)\sqrt{(m_1/2eV_E)} \tag{1}$$

An ion having the largest mass $m_2$ that can be simultaneously observed should arrive at the entrance of the orthogonal acceleration section 531 at the same point in time, so that the point in time of its arrival should be given by the following equation (2):

$$t=D\sqrt{(m_2/2eV_E)} \tag{2}$$

Accordingly, the observable mass range is as follows:

$$m_2/m_1=\{(D+L)/D\}^2 \tag{3}$$

By comparison, when the linear ion trap configured to eject ions in descending order of m/z in the previously described manner is used, heavier ions can be ejected earlier, and therefore, it is possible to control the ion trap so that those heavier ions and lighter ions which will be ejected at later points in time will simultaneously arrive at a specific position in the orthogonal acceleration section 531. Consider the case where ions of all masses should arrive at the center of the orthogonal acceleration section 531. The point in time of the arrival of the ion having the largest mass $m_2$ is given by:

$$t=(D+L/2)\sqrt{(m_2/2eV_E)} \tag{4}$$

The delay time $t_D$ required for the RF voltage control to achieve the simultaneous arrival of this ion and the ion having the smallest mass $m_1$ is given by:

$$t_D=(D+L/2)\{(\sqrt{m_2}-\sqrt{m_1})/\sqrt{(2eV_E)}\} \tag{5}$$

By performing the scan of the RF voltage so as to give the aforementioned delay time $t_D$ for the extraction of the ions from the linear ion trap 2, it is possible to cause all ions within the target mass range to almost simultaneously arrive at the same position in the orthogonal acceleration section 531. This not only allows the mass range of the observable ions to be wider than in the conventional technique, but also improves detection sensitivity and mass-resolving power since the variation in the initial position of the ions within the orthogonal acceleration section 531 is reduced. In the second configuration example, the extraction of the ions in descending order of m/z should preferably be achieved by the scan of the RF voltage, rather than the DC extraction voltage, in order to constantly maintain the amount of energy of the ions extracted from the linear ion trap as described earlier.

[Third Configuration Example of Mass Spectrometer]

Figure 11:
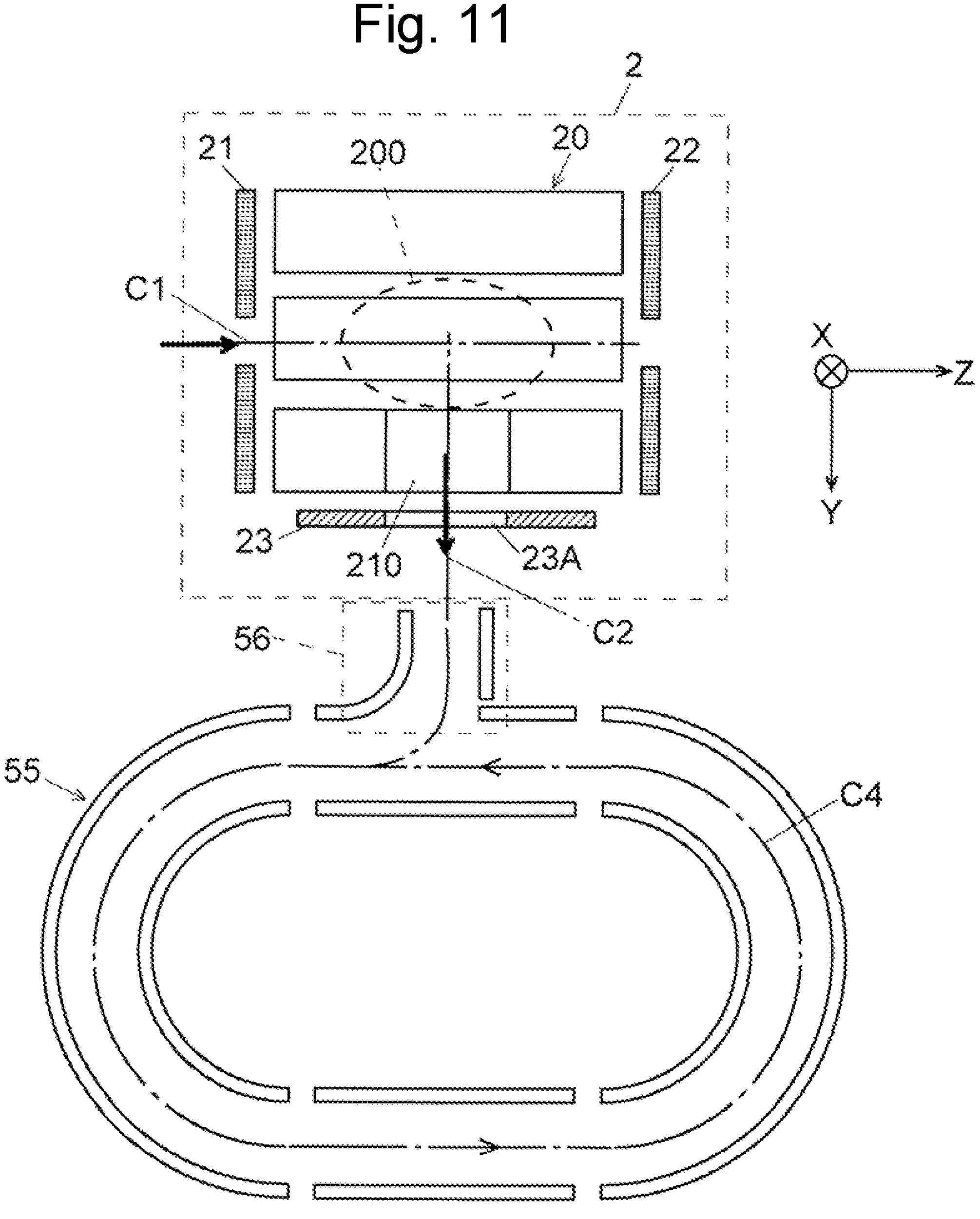
FIG. 11 is a diagram showing yet another configuration example of a mass spectrometer using the linear ion trap according to the present embodiment.

FIG. 11 is a configuration diagram of the main components of a mass spectrometer according to the third configuration example. The mass spectrometer according to the third configuration example includes the previously described linear ion trap as a front-end unit coupled with a multiturn Fourier transform mass separator 55. In this configuration, the ions ejected from the linear ion trap 2 are introduced into the multiturn Fourier transform mass separator 55 through an ion incidence section 56 and fly along a loop orbit C4. The ion incidence section 56 includes electrodes, to which voltages are applied in a switchable manner so that an entrance electric field for putting ions coming from the linear ion trap 2 into the loop orbit C4 is created during the period of time in which there are incoming ions, while a loop electric field for causing the ions to fly along the loop orbit C4 is created during the loop-flight period of the ions.

In a conventional version of this type of mass spectrometer, ions need to be almost simultaneously ejected from the ion trap and almost simultaneously put into the loop orbit C4, and therefore, the m/z range of the ions to be simultaneously subjected to the mass spectrometry must be limited to a narrow range. By comparison, in the mass spectrometer according to the third configuration example, similar to the second configuration example, it is possible to cause ions of all m/z values to almost simultaneously reach a desired position on the loop orbit C4 by ejecting ions from the linear ion trap 2 and gradually putting them into the loop orbit C4 in descending order of m/z, starting from ions having larger m/z and flying at comparatively low speeds. By this control, the m/z range of the ions to be observed can be widened. The voltage applied to the ion incidence section 56 must be switched before the ion which completes the loop flight earliest among the ions put into the loop orbit C4 via the ion incidence section 56 returns to the ion incidence section 56. However, since ions having smaller m/z are introduced into the loop orbit C4 later than ions having larger m/z, the period of time for introducing ions into the loop orbit C4 at the ion incidence section 56 can be increased so as to subject a larger amount of ions to the mass spectrometry. Accordingly, an improvement of the detection sensitivity can also be attempted.

Equation (5) for calculating the delay time $t_D$ is also applicable in the present case by letting L denote the flight length within the ion incidence section 56, and D denote the flight length to the position at which the ions should simultaneously arrive on the loop orbit C4.

The previously described embodiment and configuration examples are mere examples of the present invention and will naturally fall within the scope of claims of the present application even when a change, addition or modification is appropriately made within the spirit of the present invention.

(Clause 1) One mode of the method for driving a linear ion trap according to the present invention is a method for driving a linear ion trap in which a plurality of rod electrodes are arranged so as to surround a central axis, the method including:

- an ion-introducing step for introducing ions into an ion-capturing space surrounded by the plurality of rod electrodes, and for capturing the ions by a multipole RF electric field created within the ion-capturing space; and
- an ion-ejecting step for creating both a DC electric field for ion extraction which extends from an external area outside the ion-capturing space into the ion-capturing space through a space between two predetermined rod electrodes neighboring each other around the central axis among the plurality of rod electrodes and the multipole RF electric field, and for sequentially ejecting ions according to mass-to-charge ratios of the ions from the ion-capturing space toward the external area through the space between the two predetermined rod electrodes by changing at least one of the multipole RF electric field and the DC electric field.

(Clause 5) One mode of the mass spectrometer according to the present invention includes:

- a linear ion trap unit including a plurality of rod electrodes arranged so as to surround a central axis, and an extraction electrode located in an external area outside a space between two predetermined rod electrodes neighboring each other around the central axis among the plurality of rod electrodes;
- an RF voltage generator configured to apply an RF voltage to each of the plurality of rod electrodes so as to create a multipole RF electric field within an ion-capturing space surrounded by the plurality of rod electrodes;
- an extraction voltage generator configured to apply a DC voltage to the extraction electrode so that a DC electric field for ion extraction extends through the space between the two predetermined electrodes into the ion-capturing space; and
- a controller configured to control the RF voltage generator and the extraction voltage generator, so as to eject ions from the ion-capturing space through the space between the two predetermined rod electrodes according to the mass-to-charge ratios of the ions by changing at least one of the RF voltage and the DC voltage while the ions are confined within the ion-capturing space.

According to the present invention, the voltage that is varied for the scan when ions are to be extracted from the linear ion trap is either the RF voltage applied to the rod electrodes, or the DC voltage applied to the extraction electrode. Accordingly, the method for driving a linear ion trap according to Clause 1 and the mass spectrometer according to Clause 5 do not require applying two different types of alternating voltages, i.e., the RF and AC voltages, to the rod electrodes in a superposed form as in the conventional resonance excitation ejection. Therefore, according to these modes, it is possible to simplify the configuration of the power-supply device for driving the linear ion trap while realizing a mass scan in which ions are sequentially released from the linear ion trap in order of mass-to-charge ratio. This consequently allows the power-supply device to be smaller in size and lighter in weight, as well as lower in production cost.

(Clause 6) In the mass spectrometer according to Clause 5, the two predetermined rod electrodes may have a recess forming an ion extraction opening in combination with a portion of the space between the two predetermined rod electrodes.

In principle, it is possible to extract ions through the space between two rod electrodes neighboring each other around the central axis among the plurality of rod electrodes whose number is normally equal to or larger than six. In practice, however, the size of the aforementioned space is insufficient for allowing a DC electric field of a sufficient strength to penetrate into the ion-capturing space. By comparison, in the mass spectrometer according to Clause 6, an ion extraction opening having a sufficient size can be provided between the two predetermined rod electrodes, through which a sufficiently strong DC electric field can penetrate into the ion-capturing space, so that ions can be appropriately extracted to the outside.

(Clause 2) In the method for driving a linear ion trap according to Clause 1, the ion-ejecting step may include sequentially ejecting ions held within the ion-capturing space, in descending order of mass-to-charge ratio, by changing the multipole RF electric field while constantly maintaining the DC electric field.

In order to extract ions in descending order of mass-to-charge ratio, whichever of the two electric fields, i.e., the DC electric field and the multipole RF electric field, may be changed. However, changing the DC electric field will also change the amount of energy of each ion depending on its mass-to-charge ratio since the energy imparted to the ion for the extraction originates from the DC electric field. This may be inconvenient, for example, when ions ejected from the linear ion trap at different points in time should be made to simultaneously arrive at a specific position, as will be described later. By comparison, in the method for driving a linear ion trap according to Clause 2, the ions possess equal amounts of energy at the moment of extraction, so that the travelling speeds of those ions are dependent on their respective mass-to-charge ratios. This is convenient for controlling the arrival position of the ions.

(Clause 3) In the method for driving a linear ion trap according to Clause 1 or 2, the ion-ejecting step may include controlling at least one of the DC electric field and the multipole RF electric field so that the change in the mass-to-charge ratio of the ion ejected from the linear ion trap is synchronized with the mass scan in a mass filter located after the linear ion trap.

(Clause 7) In the mass spectrometer according to Clause 5 or 6, a mass filter may be located after the linear ion trap unit, and the controller may be configured to synchronously control the RF voltage and/or the DC voltage and a voltage applied to the mass filter so that the mass-to-charge ratio of the ion ejected from the ion-capturing space of the linear ion trap unit matches with the mass-to-charge ratio of the ion allowed to pass through the mass filter.

In the method for driving a linear ion trap according to Clause 3 and the mass spectrometer according to Clause 7, an ion having an m/z which can pass through the mass filter is selectively ejected into this filter from the linear ion trap in the previous stage. In other words, an ion having an m/z which cannot pass through the mass filter at that point in time is retained within the linear ion trap until the point in time at which that ion can pass through the mass filter. Accordingly, the method for driving a linear ion trap according to Clause 3 and the mass spectrometer according to Clause 7 can reduce the amount of ions removed by the mass filter and effectively use the generated ions, whereby the detection sensitivity can be improved.

(Clause 8) In the mass spectrometer according to one of Clauses 5-7, the linear ion trap unit may include an entrance end-cap electrode for axially introducing ions into the ion-capturing space, and the mass spectrometer may further include:

- an entrance voltage generator configured to apply, to the entrance end-cap electrode, a voltage for allowing ions to pass through and a voltage for preventing ions from passing through in a switchable manner; and
- a pole-number conversion type ion guide located before the linear ion trap unit, with the number of poles of the multipole field being different between the entrance end and the exit end of the ion guide,
- where the pole-number conversion type ion guide has an exit area within which ions are accumulated during a period of time in which the entrance voltage generator applies, to the entrance end-cap electrode, the voltage for preventing ions from passing through.

In the mass spectrometer according to Clause 8, although the introduction period during which ions can be introduced from the pole-number conversion type ion guide into the linear ion trap is limited, the ions transferred through the pole-number conversion type ion guide during the period of time other than the introduction period are accumulated in the exit area of the ion guide and introduced into the linear ion guide in the next introduction period. Therefore, even in the case where ions are continuously transferred through the pole-number conversion type ion guide, those ions will be assuredly introduced into the linear ion trap without being wasted. This increases the amount of ions to be subjected to the mass spectrometry and improves the detection sensitivity. Additionally, a transiently generated ion is less likely to be missed in the detection process, so that an accurate analysis is possible.

(Clause 4) In the method for driving a linear ion trap according to Clause 1 or 2, the ion-ejecting step may include controlling the extent of the change in at least one of the DC electric field and the multipole RF electric field so that ions having different mass-to-charge ratios ejected from the linear ion trap simultaneously arrive at a position which is at a predetermined distance from the linear ion trap.

(Clause 9) In the mass spectrometer according to Clause 5 or 6, the controller may be configured to control the rate of change of the RF voltage and/or the DC voltage or the period of time required for the change so that all ions ejected from the linear ion trap unit or ions within a predetermined mass-to-charge-ratio range among the ejected ions simultaneously arrive at a predetermined position which is at a predetermined distance from the linear ion trap unit.

When ions are ejected from the linear ion trap in descending order of m/z, if the same amount of energy is imparted to every ion, an ion having a larger m/z value has a lower speed, so that an ion having a smaller m/z and ejected at a later point in time catches up with an ion having a larger m/z and ejected at an earlier point in time. Therefore, for example, it is possible to cause all ions to almost simultaneously reach a specific position by controlling the rate of change of the RF voltage or the period of time required for that change so as to appropriately change the multipole RF electric field while constantly maintaining the DC voltage for extracting ions. This is convenient in the case where it is necessary to cause various ions having different m/z values to start from substantially the same position, or more specifically, in the case of ejecting ions from an orthogonal acceleration section in an orthogonal acceleration time-of-flight mass separator, or in the case where it is necessary to cause ions to start from a specific position on a loop orbit in a Fourier transform mass separator.

(Clause 10) In the mass spectrometer according to Clause 9, an orthogonal acceleration time-of-flight mass separator may be located after the linear ion trap unit, and the predetermined position may be a predetermined position within an orthogonal acceleration section of the orthogonal acceleration time-of-flight mass separator.

In the mass spectrometer according to Clause 10, since ions having a wide range of m/z can be almost simultaneously ejected from the orthogonal acceleration section, the m/z range of the ions to be observed can be widened. Furthermore, the detection sensitivity can be improved by subjecting a larger amount of ions to the mass spectrometry.

(Clause 11) In the mass spectrometer according to Clause 9, a Fourier transform mass separator may be located after the linear ion trap unit, and the predetermined position may be a predetermined position on an ion path in the Fourier transform mass separator.

In the mass spectrometer according to Clause 11, since ions having a wide range of m/z can be introduced into the Fourier transform mass separator, the m/z range of the ions to be observed can be widened. Furthermore, the detection sensitivity can be improved by subjecting a larger amount of ions to the mass spectrometry.

REFERENCE SIGNS LIST

1 . . . Ion Supply Unit
10 . . . Ion Source
11 . . . Pole-Number Conversion Ion Guide
2 . . . Linear Ion Trap
20 . . . Rod Electrode Group
200 . . . Ion-Capturing Space
201-206 . . . Rod Electrode
203A, 204A . . . Recess
21 . . . Entrance End-Cap Electrode
21A . . . Opening
210 . . . Ion Extraction Opening
23 . . . Extraction Electrode
23A . . . Opening
3 . . . Power Supply Unit
31 . . . End-Cap DC Power Source
32 . . . RF Power Source
33 . . . Extraction DC Power Source
4 . . . Control Unit
5 . . . Mass Spectrometry-Detection Unit
50, 52 . . . Quadrupole Mass Filter
51, 54 . . . Ion Detector
53 . . . Orthogonal Acceleration Time-of-Flight Mass Separator
531 . . . Orthogonal Acceleration Section
531A . . . Push-Out Electrode
531B . . . Pulling Electrode
532 . . . Acceleration Electrode
533 . . . Flight Tube
534 . . . Reflection Electrode
55 . . . Multi-Turn Fourier Transform Mass Separator
56 . . . Ion Incidence Section

The invention claimed is:

1. A method for driving a linear ion trap in which a plurality of rod electrodes are arranged so as to surround a central axis, the method comprising:

an ion-introducing step for introducing ions into an ion-capturing space surrounded by the plurality of rod electrodes, and for capturing the ions by a multipole RF electric field created within the ion-capturing space; and an ion-ejecting step for creating both a DC electric field for ion extraction which extends from an external area outside the ion-capturing space into the ion-capturing space through a space between two predetermined rod electrodes neighboring each other around the central axis among the plurality of rod electrodes and the multipole RF electric field, and for sequentially ejecting ions according to mass-to-charge ratios of the ions from the ion-capturing space toward the external area through the space between the two predetermined rod electrodes by changing at least one of the multipole RF electric field and the DC electric field.

2. The method for driving a linear ion trap according to claim 1, wherein the ion-ejecting step includes sequentially ejecting ions held within the ion-capturing space in descending order of mass-to-charge ratio by changing the multipole RF electric field while constantly maintaining the DC electric field.

3. The method for driving a linear ion trap according to claim 1, wherein the ion-ejecting step includes controlling at least one of the DC electric field and the multipole RF electric field so that a change in the mass-to-charge ratio of an ion ejected from the linear ion trap is synchronized with a mass scan in a mass filter located after the linear ion trap.

4. The method for driving a linear ion trap according to claim 1, wherein the ion-ejecting step includes controlling an extent of a change in at least one of the DC electric field and the multipole RF electric field so that ions having different mass-to-charge ratios ejected from the linear ion trap simultaneously arrive at a position which is at a predetermined distance from the linear ion trap.

5. A mass spectrometer, comprising:

a linear ion trap unit including a plurality of rod electrodes arranged so as to surround a central axis, and an extraction electrode located in an external area outside a space between two predetermined rod electrodes neighboring each other around the central axis among the plurality of rod electrodes;

an RF voltage generator configured to apply an RF voltage to each of the plurality of rod electrodes so as to create a multipole RF electric field within an ion-capturing space surrounded by the plurality of rod electrodes;

an extraction voltage generator configured to apply a DC voltage to the extraction electrode so that a DC electric field for ion extraction extends through the space between the two predetermined electrodes into the ion-capturing space; and a controller configured to control the RF voltage generator and the extraction voltage generator, so as to eject ions from the ion-capturing space through the space between the two predetermined rod electrodes according to mass-to-charge ratios of the ions by changing at least one of the RF voltage and the DC voltage while the ions are confined within the ion-capturing space.

6. The mass spectrometer according to claim 5, wherein the two predetermined rod electrodes have a recess forming an ion-extraction opening in combination with a portion of the space between the two predetermined rod electrodes.

7. The mass spectrometer according to claim 5, wherein:

a mass filter is located after the linear ion trap unit; and the controller is configured to synchronously control the RF voltage and/or the DC voltage and a voltage applied to the mass filter so that a mass-to-charge ratio of an ion ejected from the ion-capturing space of the linear ion trap unit matches with a mass-to-charge ratio of an ion allowed to pass through the mass filter.

8. The mass spectrometer according to claim 5, wherein:

the linear ion trap unit includes an entrance end-cap electrode for axially introducing ions into the ion-capturing space, and the mass spectrometer further comprises:

an entrance voltage generator configured to apply, to the entrance end-cap electrode, a voltage for allowing ions to pass through and a voltage for preventing ions from passing through in a switchable manner; and a pole-number conversion type ion guide located before the linear ion trap unit, with a number of poles of a multipole field being different between an entrance end and an exit end of the ion guide, where the pole-number conversion type ion guide has an exit area within which ions are accumulated during a period of time in which the entrance voltage generator applies, to the entrance end-cap electrode, the voltage for preventing ions from passing through.

9. The mass spectrometer according to claim 5, wherein the controller is configured to control a rate of change of the RF voltage and/or the DC voltage or a period of time required for the change so that all ions ejected from the linear ion trap unit or ions within a predetermined mass-to-charge-ratio range among the ejected ions simultaneously arrive at a predetermined position which is at a predetermined distance from the linear ion trap unit.

10. The mass spectrometer according to claim 9, wherein:

an orthogonal acceleration time-of-flight mass separator is located after the linear ion trap unit; and the predetermined position is a predetermined position within an orthogonal acceleration section of the orthogonal acceleration time-of-flight mass separator.

11. The mass spectrometer according to claim 9, wherein: a Fourier transform mass separator is located after the linear ion trap unit; and the predetermined position is a predetermined position on an ion path in the Fourier transform mass separator.

* * * * *